(12) United States Patent
Pinhasi et al.

(10) Patent No.: US 11,932,375 B2
(45) Date of Patent: Mar. 19, 2024

(54) AIRCRAFT WITH EXTERNAL UPPER CARGO MODULE

(71) Applicant: ISRAEL AEROSPACE INDUSTRIES LTD., Lod (IL)

(72) Inventors: Uri Pinhasi, Lod (IL); Rami Skladman, Lod (IL); Gali Oz, Lod (IL); Igor Golodriga, Lod (IL); Meital Milo, Lod (IL); Shay Arzi, Lod (IL); Rami Zaphir, Lod (IL); Michele Esther Hasid, Lod (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 18/004,947

(22) PCT Filed: Jun. 30, 2021

(86) PCT No.: PCT/IL2021/050803
§ 371 (c)(1),
(2) Date: Jan. 10, 2023

(87) PCT Pub. No.: WO2022/043984
PCT Pub. Date: Mar. 3, 2022

(65) Prior Publication Data
US 2023/0339595 A1   Oct. 26, 2023

(30) Foreign Application Priority Data
Aug. 25, 2020   (IL) .......................................... 276940

(51) Int. Cl.
*B64C 1/22*   (2006.01)
*A62C 3/08*   (2006.01)
(Continued)

(52) U.S. Cl.
CPC .................. *B64C 1/22* (2013.01); *A62C 3/08* (2013.01); *B64C 5/06* (2013.01); *B64D 9/003* (2013.01); *B64D 2009/006* (2013.01)

(58) Field of Classification Search
CPC .... B64C 1/22; B64C 5/06; A62C 3/08; B64D 9/003; B64D 2009/006; B64D 9/00; Y02T 50/40
See application file for complete search history.

(56) References Cited

U.S. PATENT DOCUMENTS

| 4,318,328 A | * | 3/1982 | Rona | ........................ | B64D 7/08 244/130 |
| 5,540,402 A | | 7/1996 | Carducci | | |

(Continued)

FOREIGN PATENT DOCUMENTS

| CN | 102642623 A | 8/2012 |
| CN | 103895867 A | 7/2014 |

(Continued)

OTHER PUBLICATIONS

International Preliminary Report on Patentability dated Aug. 7, 2022 received in PCT/IL2021/050803.

(Continued)

*Primary Examiner* — Valentina Xavier
(74) *Attorney, Agent, or Firm* — Dorsey & Whitney LLP

(57) ABSTRACT

There are provided examples of an enhanced cargo capacity aircraft, converted from a datum aircraft. The enhanced cargo capacity aircraft includes the datum aircraft and a cargo module. The datum aircraft includes at least a fuselage having a dorsal fuselage part. The cargo module is affixed to the datum aircraft, thereby converting the datum aircraft to the enhanced cargo capacity aircraft. The datum aircraft is designed for aerodynamic flight capability absent the cargo module. The enhanced cargo capacity aircraft is capable of aerodynamic flight. The cargo module provides enhanced (Continued)

cargo capacity to the datum aircraft. The cargo module includes an external aerodynamic fairing defining an internal cargo volume, and is configured for being conformally affixed in overlying relationship with respect to the dorsal fuselage part. The cargo module includes a cargo handling floor and at least one access door, and a cargo handling system configured for transporting and securing at least one cargo unit within the cargo volume. The cargo unit includes a standard unit load device (ULD).

23 Claims, 12 Drawing Sheets

(51) Int. Cl.
*B64C 5/06* (2006.01)
*B64D 9/00* (2006.01)

(56) References Cited

U.S. PATENT DOCUMENTS

| 2010/0187352 A1 | 7/2010 | Yavilevich |
| 2017/0183094 A1 | 6/2017 | McNally |
| 2019/0185144 A1 | 6/2019 | McNally |

FOREIGN PATENT DOCUMENTS

| CN | 109606694 A | 4/2019 |
| CN | 110228590 A | 9/2019 |
| RU | 2082650 C1 | 6/1997 |

OTHER PUBLICATIONS

International Search Report and Written Opinion dated Oct. 3, 2021 received in PCT/IL2021/050803.

* cited by examiner

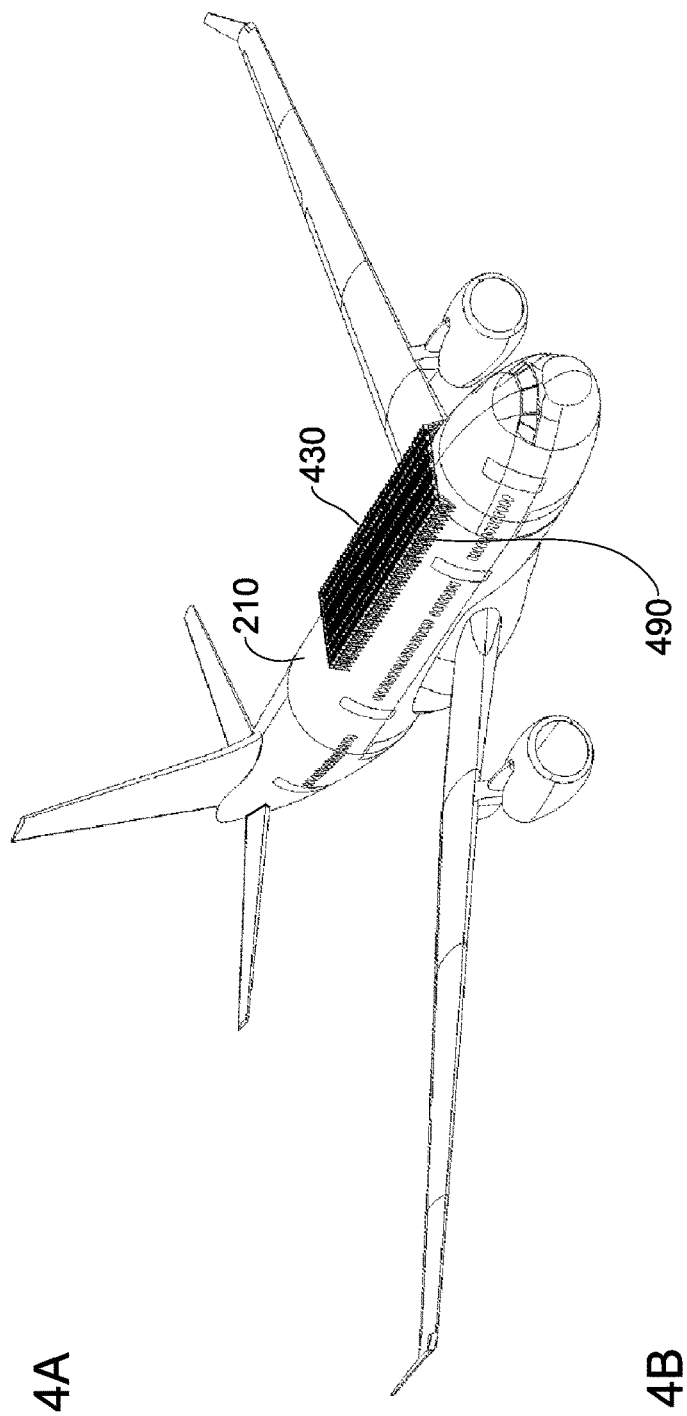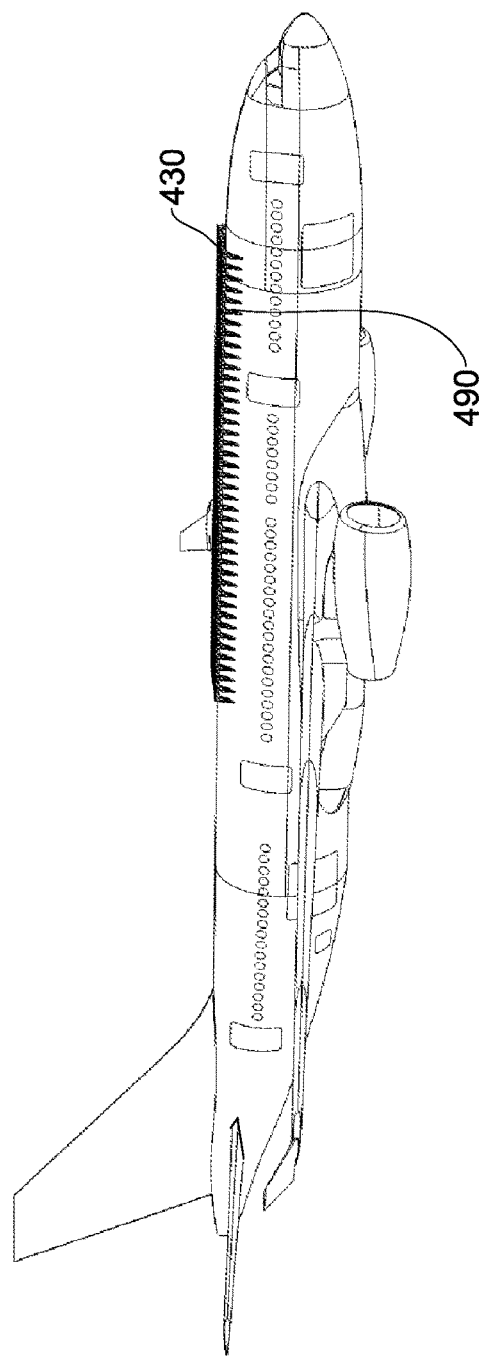
Fig. 4A
Fig. 4B

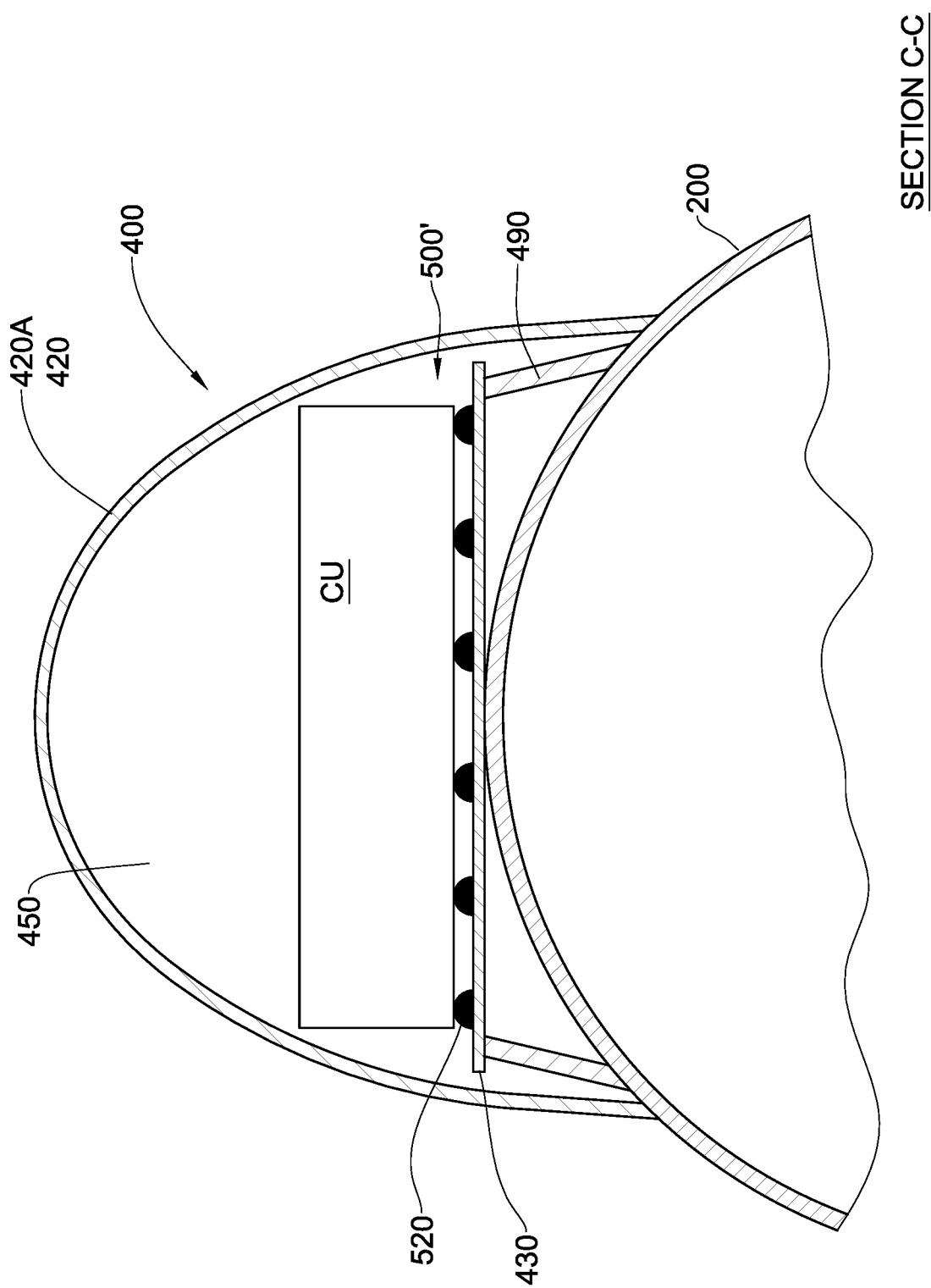
Fig. 7   SECTION C-C

AIRCRAFT WITH EXTERNAL UPPER CARGO MODULE

TECHNOLOGICAL FIELD

The presently disclosed subject matter relates to the air transportation of cargo, particularly by aircraft.

BACKGROUND

Aircraft routinely transport cargo (also referred to herein as air freight) over national and international routes. Such cargo is often packed in standard containers and pallets (conventionally referred to as Unit Load Devices—ULDs), which can be loaded, secured and unloaded from the aircraft freight deck using respective cargo handling systems (CHS).

Conventional aircraft CHS can be classified into two general categories manual handling systems; powered handling systems.

Manual CHS often include a plurality of rollers and/or castors and/or ball transfer units (BTU) set on the floor of the freight deck, ULDs are manually moved over the rollers and/or castors, and secured in place with dedicated locking devices, ropes or belts.

Powered CHS conventionally include a conveyor system that is built into the floor of the freight deck of the aircraft and which move the ULDs over the floor of the freight deck. For example, powered drive units (PDU) statically located on the freight deck provide a series of longitudinally spaced powered drive wheels on the floor that in turn engage the underside of the ULDs and horizontally move the ULDs in a variety of horizontal directions on the freight deck. When at the desired locations, the ULDs are secured thereat via a plurality of locking devices.

There are some aircraft that are designed specifically for transportation of cargo rather than passengers. However, passenger planes are used to transport a significant portion of air freight, and it is not uncommon for older passenger aircraft to be refitted for transportation of cargo, and conventionally the passenger seats are removed, and passenger windows plugged, to convert the passenger cabin to a fright deck.

GENERAL DESCRIPTION

According to an aspect of the presently disclosed subject matter there is provided an enhanced cargo capacity aircraft, converted from a datum aircraft, comprising:
(a) the datum aircraft, wherein the datum aircraft comprises at least a fuselage having a dorsal fuselage part,
(b) a cargo module affixed to the datum aircraft, thereby converting the datum aircraft to the enhanced cargo capacity aircraft;
(c) the datum aircraft being designed for aerodynamic flight capability absent said cargo module;
(d) the enhanced cargo capacity aircraft being capable of aerodynamic flight;
(e) the cargo module providing enhanced cargo capacity to the datum aircraft, the cargo module comprising an external aerodynamic fairing and an internal cargo volume, and configured for being conformally affixed in overlying relationship with respect to the dorsal fuselage part, the cargo module comprising a cargo handling floor and at least one access door, and a cargo handling system configured for transporting and securing at least one cargo unit within said cargo volume, wherein said cargo unit comprises a standard unit load device (ULD).

For example, each said ULD is in the form of a standardized cargo pallet or in the form of standardized cargo container.

Additionally or alternatively, for example, said cargo module comprises suitable locking devices for locking the respective ULD thereto.

Additionally or alternatively, for example, at least one said ULD is in the form of a standardized cargo pallet having a pallet plan area (width×length) including any one of: 125 inch×96 inch, or 125 inch×88 inch, or 156.2 cm×153.4 cm.

Additionally or alternatively, for example, at least one said ULD is in the form of a standardized cargo pallet, including for example any one of the following pallets: PLA, PNA, P6P, LD-7, M-6.

Additionally or alternatively, for example, at least one said ULD is in the form of a standardized cargo container, including for example any one of the following cargo containers: AAA, AAY, AYY, AKE, AMV, LD-1, LD-2, LD-3, LD-4, LD-6, LD-8, LD-11, LD-26, M-1, M-1H.

Additionally or alternatively, for example, said cargo handling floor is nominally flat and configured for enabling said cargo handling system to transport and secure said at least one cargo unit within said cargo volume.

Additionally or alternatively, for example, said cargo module comprises a plurality of powered drive units (PDU) statically located on the cargo floor.

Additionally or alternatively, for example, said cargo module comprises at least one said access door in the form of a side door and configured for enabling lateral access to the internal cargo volume.

Additionally or alternatively, for example, said cargo module comprises at least one said access door in the form of a front door and configured for enabling longitudinal access to the internal cargo volume.

Additionally or alternatively, for example, said cargo module is configured for enabling the cargo floor to be affixed to the dorsal fuselage part.

Additionally or alternatively, for example, said cargo module is coupled to the fire extinguisher system of the datum aircraft.

Additionally or alternatively, for example, said cargo module comprises an independent smoke detection system and an independent fire extinguishing system, the independent smoke detection system configured for being monitored in the datum aircraft, and the fire extinguishing system configured for being controlled by the datum aircraft.

Additionally or alternatively, for example, said cargo module is electrically coupled to the electrical system of the datum aircraft.

Additionally or alternatively, for example, said cargo module is non-pressurized with respect to the external atmospheric environment.

Additionally or alternatively, for example, an access hatch is provided between the interior of the fuselage of the datum aircraft and the interior of the cargo module; in operation such an access hatch can provide access to the cargo volume of the cargo module from the fuselage, for example when the aircraft is on the ground.

Additionally or alternatively, for example, said datum aircraft comprises a vertical stabilizer, and wherein said enhanced cargo capacity aircraft comprises a auxiliary vertical stabilizer arrangement configured for enhancing an effectiveness of the vertical stabilizer. For example, said auxiliary vertical stabilizer arrangement comprises a port ventral strake and a starboard ventral strake, affixed to said fuselage in V-arrangement. Alternatively, for example, said datum aircraft includes horizontal stabilizers, and wherein said auxiliary vertical stabilizer arrangement comprises auxiliary vertical stabilizers affixed to the horizontal stabilizer.

Additionally or alternatively, for example, said cargo module further comprises a loading ramp configured for being deployed therefrom, in particular from an access door of the cargo module, in a telescopic manner to facilitate loading/unloading cargo between the cargo volume and an outside of the enhanced cargo capacity aircraft.

Additionally or alternatively, for example, the cargo module is configured, at least when affixed to the datum aircraft, such as to preserve aeroelastic characteristics of the datum aircraft in the enhanced cargo capacity aircraft.

Additionally or alternatively, for example, the datum aircraft is any suitable aircraft selected from the group including: Boeing 787, Boeing 777, Boeing 767, Boeing 757, Boeing 747, Boeing 737, Airbus 350, Airbus 340, Airbus 330, Airbus 320, Airbus 310, Airbus 300, Comac C-919, Comac 929, An-70, Irkut MC-21, Embraer E-Jet, ARJ21.

According to this aspect of the presently disclosed subject matter, there is also provided a cargo module configured for providing enhanced cargo capacity to a datum aircraft, to thereby provide an enhanced cargo capacity aircraft. The cargo module comprises an external aerodynamic fairing and an internal cargo volume, and is configured for being conformally affixed in overlying relationship with respect to a dorsal fuselage part of the datum aircraft, the cargo module comprising a cargo handling floor and at least one access door, and a cargo handling system configured for transporting and securing at least one cargo unit within said cargo volume, wherein said cargo unit comprises a standard unit load device (ULD).

According to this aspect of the presently disclosed subject matter, there is also provided a method for converting a datum aircraft into an enhanced cargo capacity aircraft, comprising:
(a) providing the datum aircraft, wherein the datum aircraft comprises at least a fuselage having a dorsal fuselage part,
(b) providing a cargo module configured for providing enhanced cargo capacity to the datum aircraft, the cargo module comprising an external aerodynamic fairing defining an internal cargo volume, and configured for being conformally affixed in overlying relationship with respect to the dorsal fuselage part, the cargo module comprising a cargo handling floor and at least one access door, and a cargo handling system configured for transporting and securing at least one cargo unit within said cargo volume, wherein said cargo unit comprises a standard unit load device (ULD);
(c) affixed the cargo module to the datum aircraft, thereby converting the datum aircraft to the enhanced cargo capacity aircraft;
wherein the datum aircraft is designed for aerodynamic flight capability absent said cargo module; and
wherein the enhanced cargo capacity aircraft is capable of aerodynamic flight.

For example, the method further comprises electrically coupling said cargo module to an electrical system of the datum aircraft.

Additionally or alternatively, for example, the method further comprises coupling said cargo module to a fire extinguisher system of the datum aircraft.

Additionally or alternatively, for example, the method further comprises providing said cargo module with an independent smoke detection system and an independent fire extinguishing system, the independent smoke detection system configured for being monitored in the datum aircraft, and the fire extinguishing system configured for being controlled by the datum aircraft.

Additionally or alternatively, for example, said datum aircraft comprises a vertical stabilizer, and the method further comprises providing an auxiliary vertical stabilizer arrangement configured for enhancing an effectiveness of the vertical stabilizer. For example, said auxiliary vertical stabilizer arrangement comprises a port ventral strake and a starboard ventral strake, affixed to said fuselage in V-arrangement, or, wherein said datum aircraft includes horizontal stabilizers, and wherein said auxiliary vertical stabilizer arrangement comprises auxiliary vertical stabilizers affixed to the horizontal stabilizer.

Additionally or alternatively, for example, in step (c) the cargo module is affixed to the datum aircraft in a manner such as to preserve aeroelastic characteristics of the datum aircraft in the enhanced cargo capacity aircraft.

Additionally or alternatively, for example, the datum aircraft is any suitable aircraft selected from the group including: Boeing 787, Boeing 777, Boeing 767, Boeing 747, Boeing 757, Boeing 737, Airbus 350, Airbus 340, Airbus 330, Airbus 320, Airbus 310, Airbus 300, Comac C-919, Comac 929, An-70, Irkut MC-21, Embraer E-Jet, ARJ21.

According to another aspect of the presently disclosed subject matter, there is provided an enhanced cargo capacity aircraft, converted from a datum aircraft, comprising:
(a) the datum aircraft, including at least a fuselage having a dorsal fuselage part,
(b) a cargo module affixed to the datum aircraft, thereby converting the datum aircraft to the enhanced cargo capacity aircraft;
(c) the datum aircraft designed for aerodynamic flight capability absent said cargo module,
(c) the enhanced cargo capacity aircraft being capable of aerodynamic flight;
(e) the cargo module providing enhanced cargo capacity to the datum aircraft, the cargo module comprising an external aerodynamic fairing and an internal cargo volume, and configured for being conformally affixed in overlying relationship with respect to the dorsal fuselage part, the cargo module comprising a cargo handling floor and at least one access door, and a cargo handling system configured for transporting and securing at least one cargo unit within said cargo volume, wherein said cargo handling floor is nominally flat and comprises a manual cargo handling system.

For example, each said cargo unit is in the form of a unit load device (ULD), and wherein each said ULD is in the form of a standardized cargo pallet or in the form of standardized cargo container.

Additionally or alternatively, for example, said cargo module comprises suitable locking devices for locking the respective cargo unit thereto.

Additionally or alternatively, for example, at least one said ULD is in the form of a standardized cargo pallet having a pallet plan area (width×length) including any one of: 125 inch×96 inch, or 125 inch×88 inch, or 156.2 cm×153.4 cm.

Additionally or alternatively, for example, at least one said ULD is in the form of a standardized cargo pallet, including for example any one of the following pallets: PLA. PNA, P6P, LD-7, M-6.

Additionally or alternatively, for example, at least one said ULD is in the form of a standardized cargo container, including for example any one of the following cargo containers: AAA, AAY, AYY, AKE, AMV, LD-1, LD-2, LD-3, LD-4, LD-6, LD-8, LD-11, LD-26, M-1, M-1H.

Additionally or alternatively, for example, said cargo handling floor is nominally flat and configured for enabling said cargo handling system to transport and secure said at least one cargo unit within said cargo volume.

Additionally or alternatively, for example, said cargo module comprises at least one said access door in the form of a side door and configured for enabling lateral access to the internal cargo volume.

Additionally or alternatively, for example, said cargo module comprises a plurality of rollers and/or castors and/or ball transfer units (BTU) set on the cargo floor.

Additionally or alternatively, for example, said cargo module comprises at least one said access door in the form of a front door and configured for enabling longitudinal access to the internal cargo volume.

Additionally or alternatively, for example, said cargo module is configured for enabling the cargo floor to be affixed to the dorsal fuselage part.

Additionally or alternatively, for example, said cargo module is coupled to the fire extinguisher system of the datum aircraft.

Additionally or alternatively, for example, said cargo module comprises an independent smoke detection system and an independent fire extinguishing system, the independent smoke detection system configured for being monitored in the datum aircraft, and the fire extinguishing system configured for being controlled by the datum aircraft.

Additionally or alternatively, for example, said cargo module is electrically coupled to the electrical system of the datum aircraft.

Additionally or alternatively, for example, said cargo module is non-pressurized with respect to the external atmospheric environment.

Additionally or alternatively, for example, an access hatch is provided between the interior of the fuselage of the datum aircraft and the interior of the cargo module; in operation such an access hatch can provide access to the cargo volume of the cargo module from inside the fuselage, for example when the aircraft is on the ground.

Additionally or alternatively, for example, said datum aircraft comprises a vertical stabilizer, and wherein said enhanced cargo capacity aircraft comprises a auxiliary vertical stabilizer arrangement configured for enhancing an effectiveness of the vertical stabilizer. For example, said auxiliary vertical stabilizer arrangement comprises a port ventral strake and a starboard ventral strake, affixed to said fuselage in V-arrangement. Alternatively, for example, said datum aircraft includes horizontal stabilizers, and wherein said auxiliary vertical stabilizer arrangement comprises auxiliary vertical stabilizers affixed to the horizontal stabilizer.

Additionally or alternatively, for example, said cargo module further comprises a loading ramp configured for being deployed therefrom, in particular from an access door of the cargo module, in a telescopic manner to facilitate loading/unloading cargo between the cargo volume and an outside of the enhanced cargo capacity aircraft.

Additionally or alternatively, for example, the cargo module is configured, at least when affixed to the datum aircraft, such as to preserve aeroelastic characteristics of the datum aircraft in the enhanced cargo capacity aircraft.

Additionally or alternatively, for example, the datum aircraft is any suitable aircraft selected from the group including: Boeing 787, Boeing 777, Boeing 767, Boeing 757, Boeing 747, Boeing 737, Airbus 350, Airbus 340, Airbus 330, Airbus 320, Airbus 310, Airbus 300, Comac C-919, Comac 929, An-70, Irkut MC-21, Embraer E-Jet, ARJ21.

According to this aspect of the presently disclosed subject matter, there is also provided a cargo module configured for providing enhanced cargo capacity to a datum aircraft, to thereby provide an enhanced cargo capacity aircraft. The cargo module comprises an external aerodynamic fairing and an internal cargo volume, and is configured for being conformally affixed in overlying relationship with respect to a dorsal fuselage part of the datum aircraft, the cargo module comprising a cargo handling floor and at least one access door, and a cargo handling system configured for transporting and securing at least one cargo unit within said cargo volume, wherein said cargo handling floor is nominally flat and comprises a manual cargo handling system.

According to this aspect of the presently disclosed subject matter, there is also provided a method for converting a datum aircraft into an enhanced cargo capacity aircraft, comprising:
(a) providing the datum aircraft, wherein the datum aircraft comprises at least a fuselage having a dorsal fuselage part,
(b) providing a cargo module configured for providing enhanced cargo capacity to the datum aircraft, the cargo module comprising an external aerodynamic fairing defining an internal cargo volume, and configured for being conformally affixed in overlying relationship with respect to the dorsal fuselage part, the cargo module comprising a cargo handling floor and at least one access door, and a cargo handling system configured for transporting and securing cargo units within said cargo volume, wherein said cargo handling floor is nominally flat and comprises a manual cargo handling system;
(c) affixed the cargo module to the datum aircraft, thereby converting the datum aircraft to the enhanced cargo capacity aircraft;
wherein the datum aircraft is designed for aerodynamic flight capability absent said cargo module; and
wherein the enhanced cargo capacity aircraft is capable of aerodynamic flight.

For example, the method further comprises electrically coupling said cargo module to an electrical system of the datum aircraft.

Additionally or alternatively, for example, the method further comprises coupling said cargo module to a fire extinguisher system of the datum aircraft.

Additionally or alternatively, for example, the method further comprises providing said cargo module with an independent smoke detection system and an independent fire extinguishing system, the independent smoke detection system configured for being monitored in the datum aircraft, and the fire extinguishing system configured for being controlled by the datum aircraft.

Additionally or alternatively, for example, said datum aircraft comprises a vertical stabilizer, and the method further comprises providing an auxiliary vertical stabilizer arrangement configured for enhancing an effectiveness of the vertical stabilizer. For example, said auxiliary vertical stabilizer arrangement comprises a port ventral strake and a starboard ventral strake, affixed to said fuselage in V-arrangement, or, wherein said datum aircraft includes horizontal stabilizers, and wherein said auxiliary vertical stabilizer arrangement comprises auxiliary vertical stabilizers affixed to the horizontal stabilizer.

Additionally or alternatively, for example, in step (c) the cargo module is affixed to the datum aircraft in a manner such as to preserve aeroelastic characteristics of the datum aircraft in the enhanced cargo capacity aircraft.

Additionally or alternatively, for example, the datum aircraft is any suitable aircraft selected from the group including: Boeing 787, Boeing 777, Boeing 767, Boeing 757, Boeing 747, Boeing 737, Airbus 350, Airbus 340, Airbus 330, Airbus 320, Airbus 310, Airbus 300, Comac C-919, Comac 929, An-70, Irkut MC-21, Embraer E-Jet, ARJ21.

A feature of at least one example of the presently disclosed subject matter is that a conventional datum aircraft can be converted to enhance the cargo capacity of the aircraft with minimal changes in the datum aircraft. Such minimal changes can include the structural modifications to the datum aircraft for allowing the cargo module to be affixed to an external part of the datum aircraft, in particular the dorsal part of the fuselage. Such minimal changes can also include for example extending the electrical power system and the fire extinguisher system of the datum aircraft to the cargo module.

Another feature of at least one example of the presently disclosed subject matter is that a conventional datum aircraft can be converted to an enhanced cargo capacity aircraft at relatively low cost.

Another feature of at least one example of the presently disclosed subject matter is that a conventional datum aircraft can be converted to an enhanced cargo capacity aircraft in a relative short space of time.

Another feature of at least one example of the presently disclosed subject matter is that a conventional datum aircraft can be converted to carry cargo externally of the aircraft with minimal changes in the datum aircraft.

Another feature of at least one example of the presently disclosed subject matter is that the converted aircraft can be converted back to the original conventional datum aircraft by removing the cargo module.

Another feature of at least one example of the presently disclosed subject matter is that the enhanced cargo capacity aircraft is configured for transporting ULDs in the cargo module.

Another feature of at least one example of the presently disclosed subject matter is that a conventional datum aircraft can be converted to an enhanced cargo capacity aircraft without the need to convert or modify the current freight deck or passenger deck of the datum aircraft to accommodate cargo per se.

Another feature of at least one example of the presently disclosed subject matter is that a conventional datum aircraft can be converted to carry cargo externally with a relatively small drag penalty, for example less than or about 10% above the drag of the datum aircraft.

Another feature of at least one example of the presently disclosed subject matter is that the enhanced cargo capacity aircraft can fly while the cargo module is non-pressurized with respect to the external atmosphere, which can reduce pressure loading on the cargo module as well as fatigue.

Another feature of at least one example of the presently disclosed subject matter is that the enhanced cargo capacity aircraft comprises a cargo module that is configured for being non-pressurized with respect to the external atmosphere, thereby minimizing unit costs and/or weight as compared with a corresponding pressurized cargo module.

Another feature of at least one example of the presently disclosed subject matter is that the enhanced cargo capacity aircraft can be adapted to carry unusual loads, for example cargo having a large longitudinal dimension—for example wind turbine blades or wings of smaller aircraft.

Another feature of at least one example of the presently disclosed subject matter is that the structure of the cargo module, and/or the manner in which the cargo module is affixed to the datum aircraft can be such as to preserve the aeroelastic characteristics of the datum aircraft in the enhanced cargo capacity aircraft.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which:

FIG. 4A is a front-side-top isometric view of the datum aircraft of the example of FIG. 1A, including a cargo floor of the cargo module of the enhanced cargo capacity aircraft of the example of FIG. 2A; FIG. 4B is a side view of the example of FIG. 4A.

FIG. 7 is a partial cross-sectional view of the example of FIG. 2B taken along C-C, wherein the respective cargo module comprises a second example of a cargo handling system.

DETAILED DESCRIPTION

Referring to FIGS. 1A, 1B, 2A, 2B, an enhanced cargo capacity aircraft (also referred to interchangeably herein as a converted aircraft) according to a first example of the presently disclosed subject matter, generally designated 100, comprises a datum aircraft 200 (also referred to interchangeably herein as an unconverted aircraft), and a cargo module 400.

In at least this example the datum aircraft is manned, and the datum aircraft is configured for powered subsonic and/or transonic aerodynamic flight.

Figure 1A:
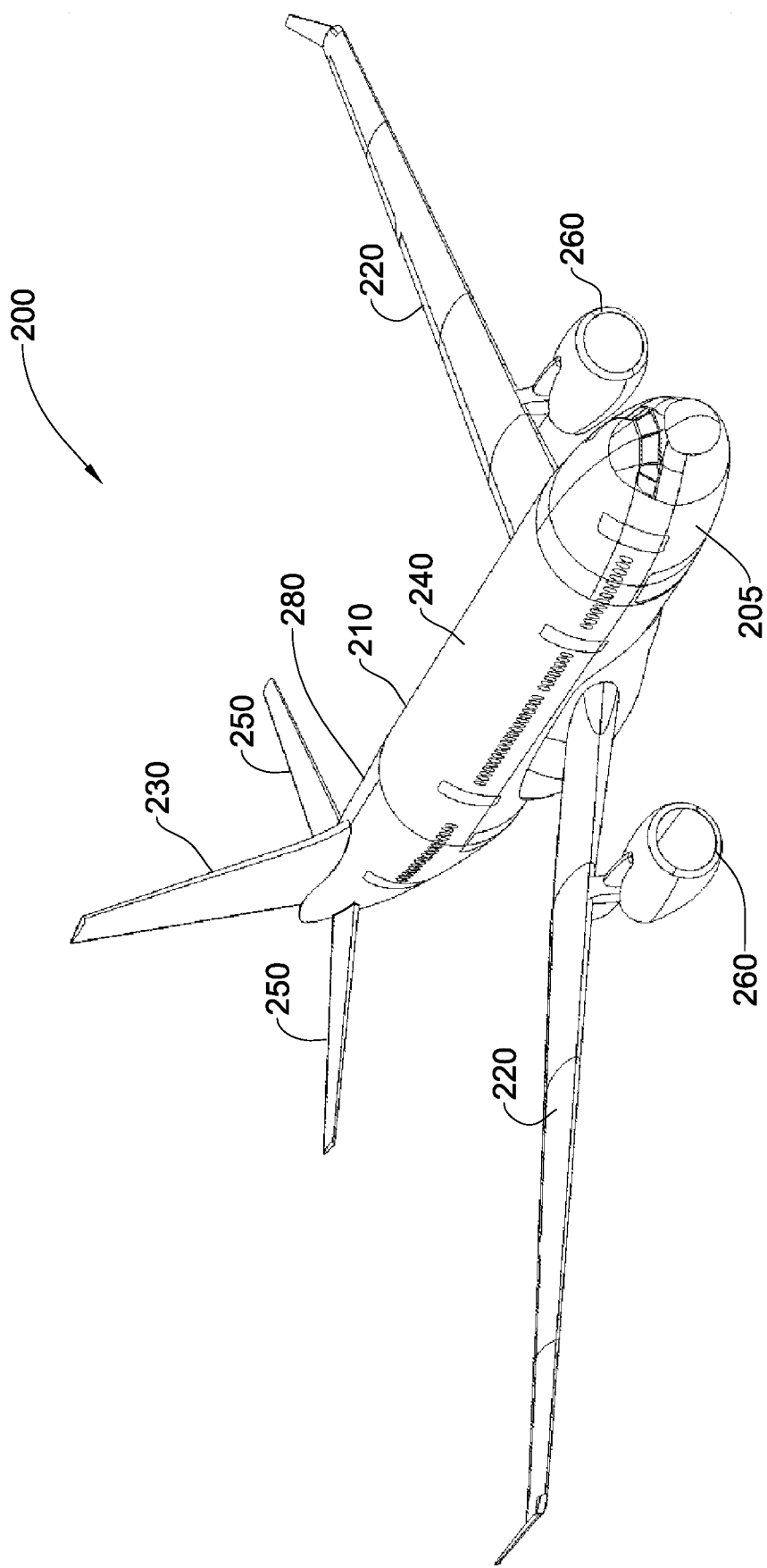
FIG. 1A is a front-side-top isometric view of a datum aircraft according to an example of the presently disclosed subject matter.
Figure 1B:
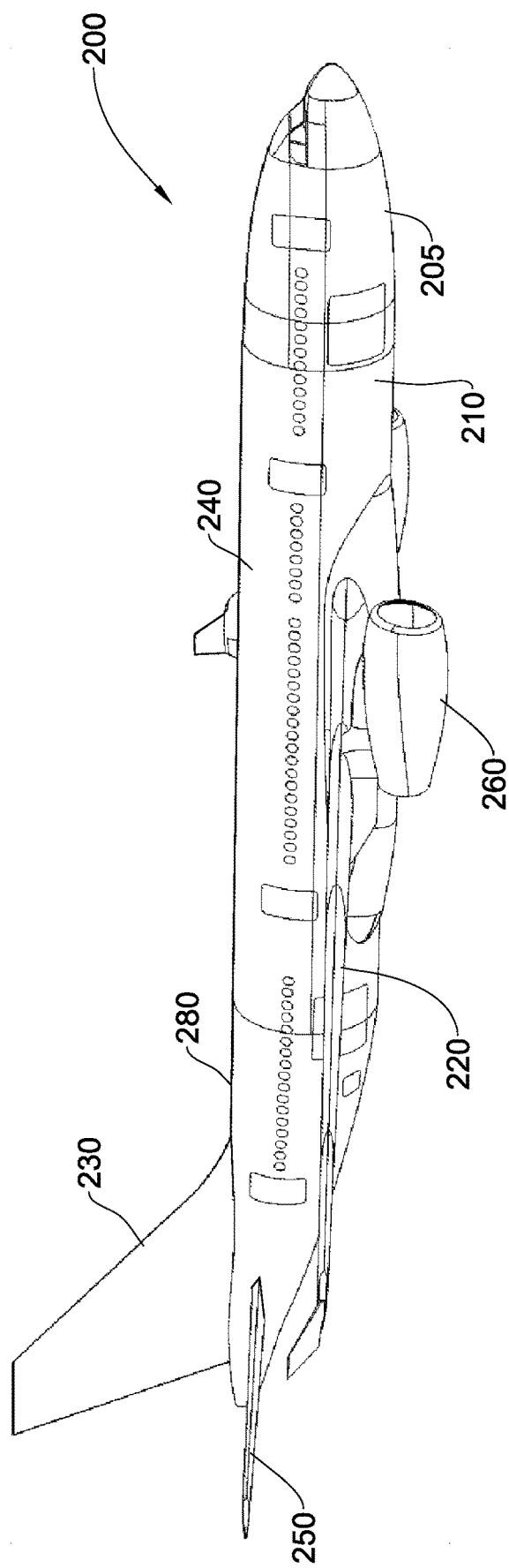
FIG. 1B is a side view of the example of FIG. 1A.
Figure 2A:
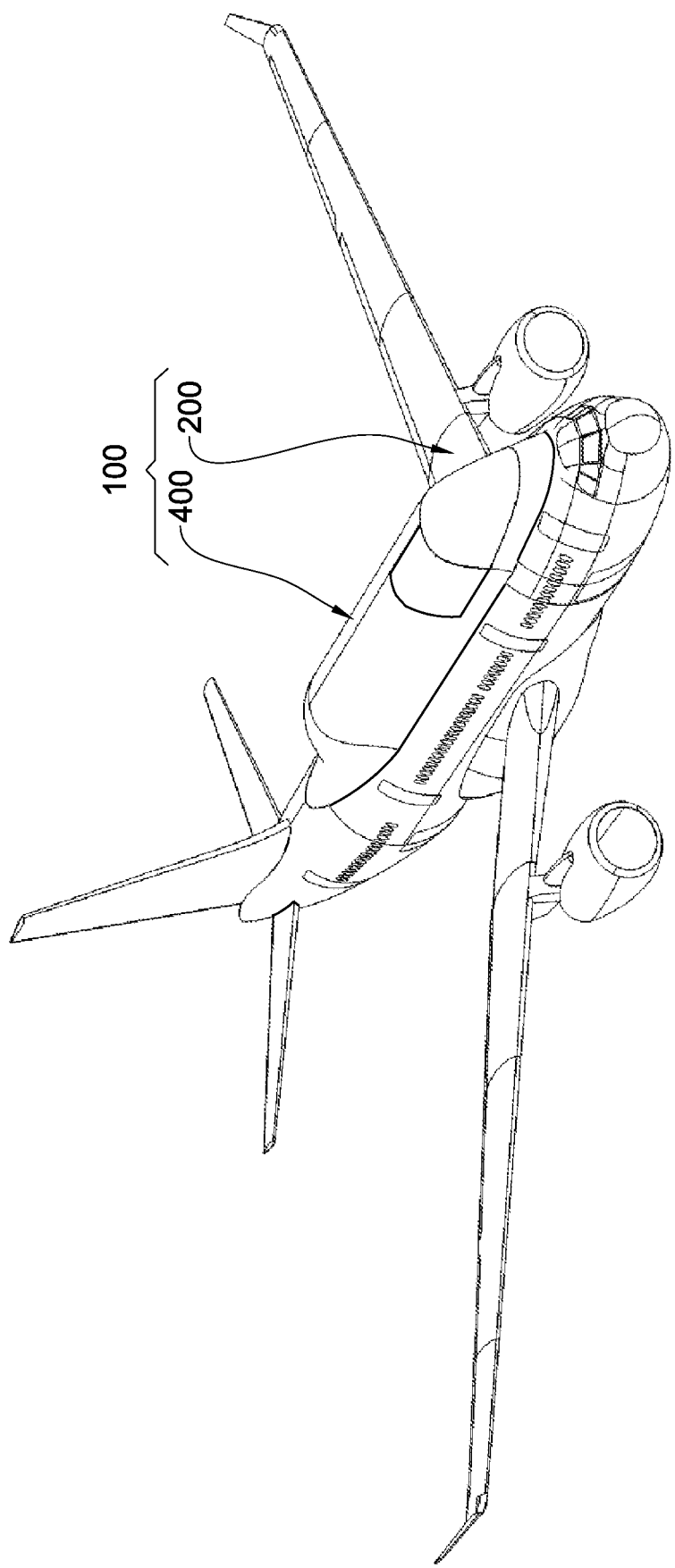
FIG. 2A is a front-side-top isometric view of an enhanced cargo capacity aircraft according to an example of the presently disclosed subject matter, based on the datum aircraft example of FIG. 1A.
Figure 2B:
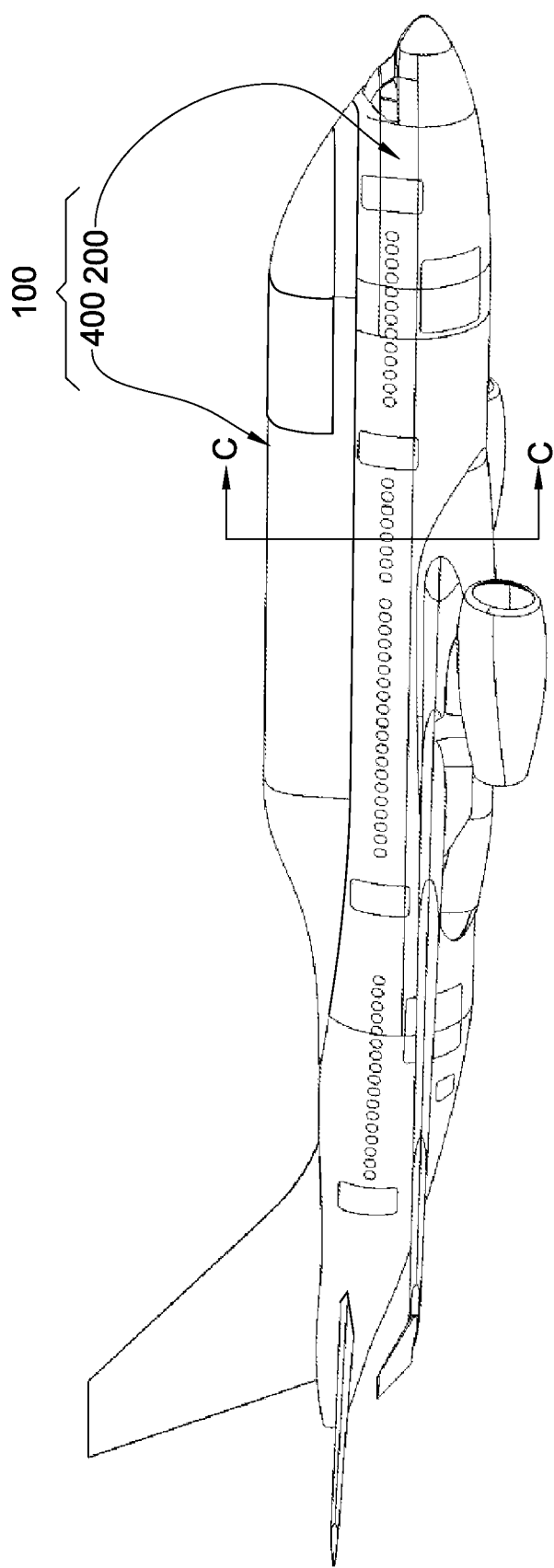
FIG. 2B is a side view of the example of FIG. 2A.

In at least this example, and referring in particular to FIGS. 1A and 1B, the datum aircraft 200 is of a conventional design, having a fuselage 210, port and starboard lift generating wings 220, tail section 280 including vertical stabilizer 230 and horizontal stabilizer 250, and propulsion system 260, for example including wing mounted turbofan engines.

In at least this example, the fuselage 210 is of the subsonic/transonic conventional design, comprising generally cylindrical and generally uniform cross-sections, from aft of the cockpit 205 to the tail section 280. The fuselage 210 can be configured for carrying passengers and/or cargo, and has at least one access door (also referred to herein interchangeably as a cargo door) for providing access to the interior of the fuselage 210.

In at least this example, the fuselage 210 has an outer skin, including a dorsal skin portion 240 on the dorsal portion 245 of the fuselage 210.

It is to be noted that according to an aspect of the presently disclosed subject matter, the datum aircraft 200 is designed for, and capable of, aerodynamic flight, in particular powered aerodynamic flight, absent the cargo module 400.

Thus, by way of non-limiting example, the datum aircraft 200 can be any suitable aircraft, for example any existing or future commercial aircraft or for example any existing or future military transport aircraft. For example, such a datum aircraft 200 can be any suitable aircraft selected from the group including: Boeing 787, Boeing 777, Boeing 767, Boeing 757, Boeing 747, Boeing 737, Airbus 350, Airbus 340, Airbus 330, Airbus 320, Airbus 310, Airbus 300, Comac C-919, Comac 929, An-70, Irkut MC-21, Embraer E-Jet, ARJ21, and so on.

According to an aspect of the presently disclosed subject matter, the cargo module 400 is affixed to the datum aircraft 200 to thereby significantly add cargo capacity to the datum aircraft 200, and thus convert the datum aircraft 200 to the enhanced cargo capacity aircraft 100.

In particular, such cargo capacity is in the form of cargo volume capacity, while the actual all-up weight of the enhanced cargo capacity aircraft 100 can remain the same as for the datum aircraft 200. This can, for example, enable the full cargo weight capacity of the datum aircraft 200 to be realized in the enhanced cargo capacity aircraft 100, when the actual cargo is low density, and there is insufficient volume capacity in the datum aircraft 200 to accommodate such cargo up to the maximum allowable cargo weight. Thus, the enhanced cargo capacity aircraft 100 can provide a larger volumetric cargo capacity than the original datum aircraft 200.

In some applications of the presently disclosed subject matter the enhanced cargo capacity aircraft 100 can retain the passenger cabin of the datum aircraft 200, and provides additional cargo volume capacity, in which cargo can be accommodated while maintaining the all-up weight at take-off within the limits of the datum aircraft 200.

Figure 3A:
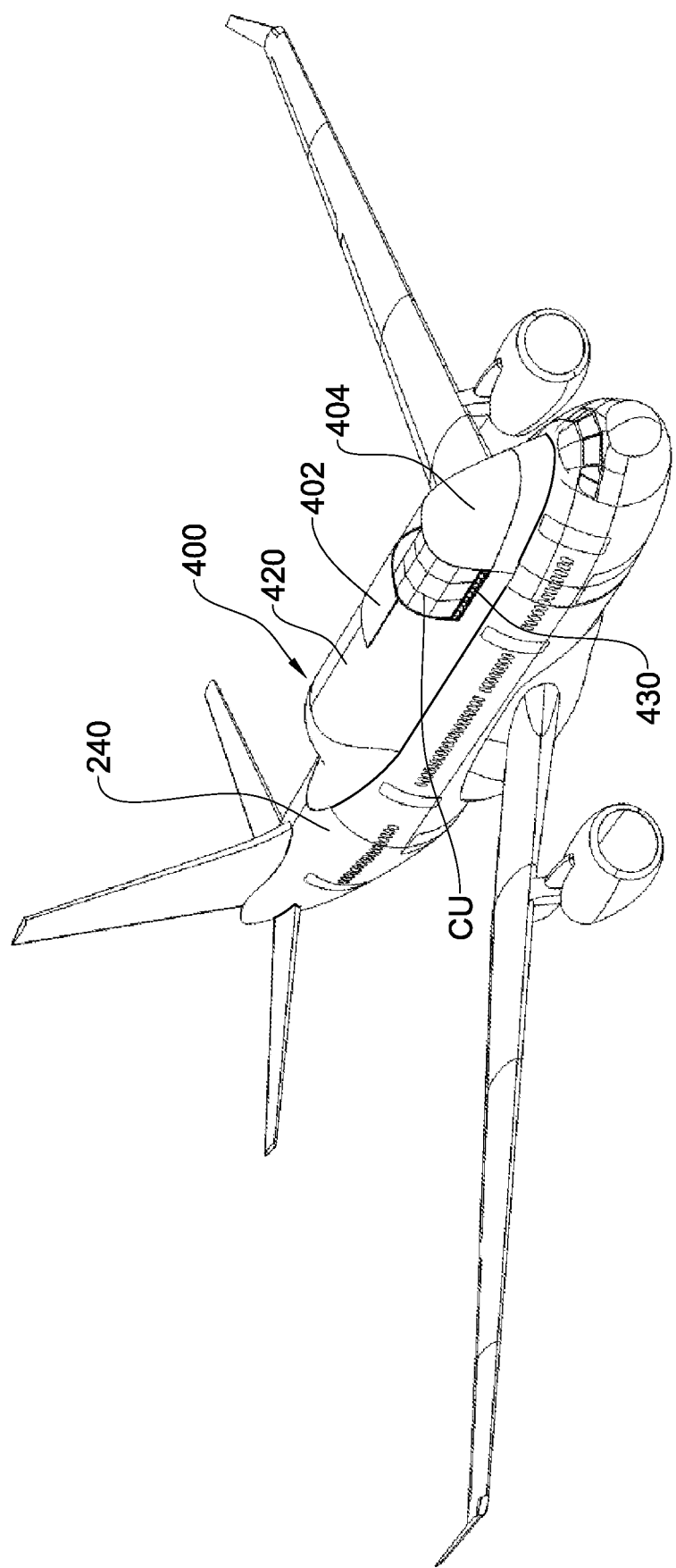
FIG. 3A is a front-side-top isometric view of an enhanced cargo capacity aircraft according to the example of FIG. 2A, with a side cargo door of the cargo module in the open position.
Figure 3B:
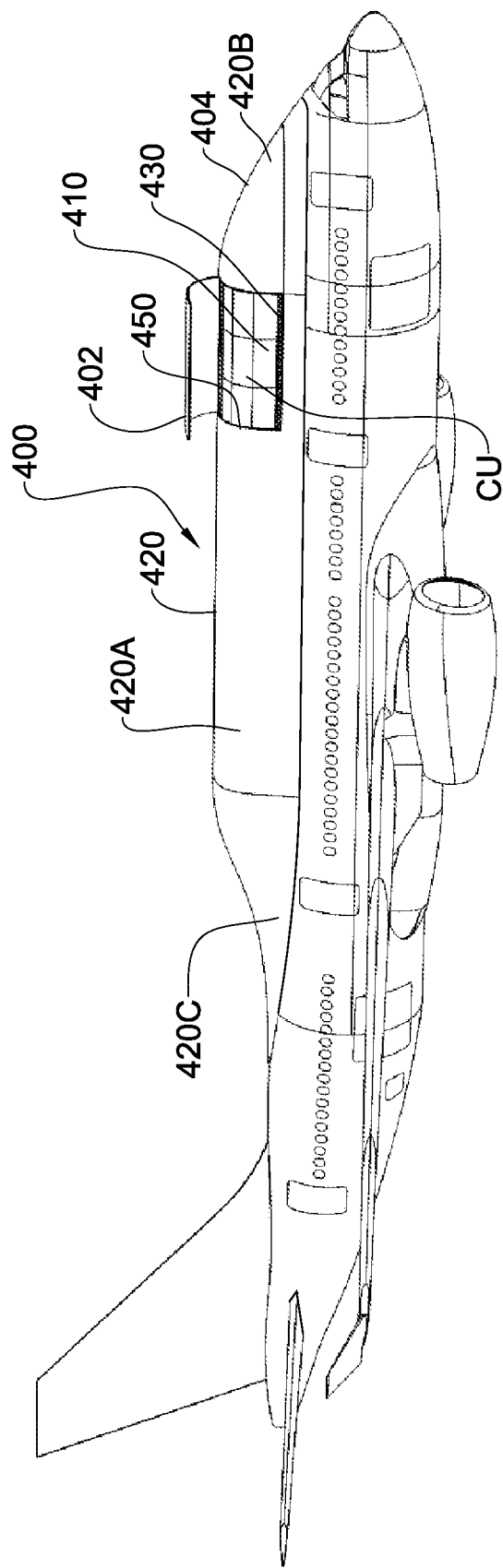
FIG. 3B is a side view of an enhanced cargo capacity aircraft according to the example of FIG. 2A, with a side cargo door of the cargo module in the open position.

Referring also to FIGS. 3A and 3B, and according to an aspect of the presently disclose subject matter, the cargo module 400 is configured for accommodating and thus transporting therein, via the enhanced cargo capacity aircraft 100, a plurality of cargo units CU, which in at least this example are in the form of conventional unit load devices (ULDs).

The cargo module 400 comprises a freight deck 410, including cargo handling floor 430, and an external aerodynamic fairing 420. The cargo module 400 comprises an internal cargo volume 450, generally bounded by the cargo handling floor 430 and the inside of the external aerodynamic fairing 420. Clearly, the cargo handling floor 430 and the internal cargo volume 450 are different from the interior of the fuselage 210.

The external aerodynamic fairing 420 is configured for being conformally affixed in overlying relationship with respect to the datum aircraft 200, in particular the fuselage 210, more in particular the dorsal fuselage skin 240.

Figure 3C:
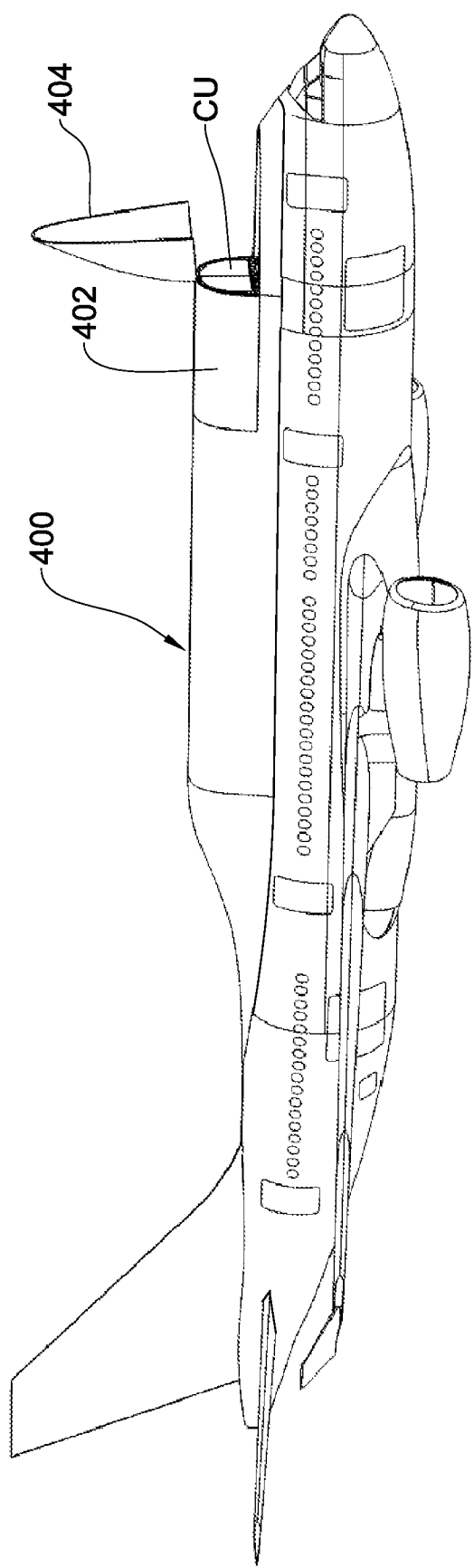
FIG. 3C is a side view of an enhanced cargo capacity aircraft according to the example of FIG. 2A, with a front cargo door of the cargo module in the open position.

Referring also to FIG. 3C, the cargo module 400 also comprises at least one access door, and in this example the cargo module 400 comprises two access doors—for example side cargo door 402 and front cargo door 404. Each access door independently allows full cargo access between the internal cargo volume 450 and the outside of the cargo module 400, i.e., between the internal cargo volume 450 and the outside of the enhanced cargo capacity aircraft 100. Side door 402 is hingedly mounted to the external aerodynamic fairing 420 and allows lateral cargo access between the internal cargo volume 450 and the outside of the cargo module 400, i.e., between the internal cargo volume 450 and the outside of the enhanced cargo capacity aircraft 100. Front door 404 allows longitudinal cargo access between the internal cargo volume 450 and the outside of the cargo module 400, i.e., between the internal cargo volume 450 and the outside of the enhanced cargo capacity aircraft 100.

Referring also to FIGS. 4A and 4B, the cargo handling floor 430 is affixed to the upper part of fuselage 210 via a series of struts 490 that couple the cargo handling floor 430 to the fuselage 210 in a load bearing manner. For example, each strut 490 can be bolted or riveted to an internal transverse frame and/or to longitudinal stringers of the fuselage 210 via the fuselage skin.

It is to be noted that at least in this example, a conventional datum aircraft can be converted to enhance the cargo capacity of the aircraft with minimal changes in the datum aircraft. Such minimal changes can include the structural modifications to the datum aircraft for allowing the cargo module to be affixed to an external part of the datum aircraft, in particular the dorsal part of the fuselage. Such minimal changes can also include for example extending the electrical power system and the fire extinguisher system of the datum aircraft to the cargo module. Thus, the original passenger deck and/or the cargo deck of the datum aircraft 200 does not require to be modified in a major manner, other than for allowing the coupling of the cargo module 400. This enables the conversion of the datum aircraft 200 to the enhanced cargo capacity aircraft 100 to be carried out in a fast manner and at relatively small cost.

It is to be noted that at least in this example, the cargo module 400 is configured, at least when affixed to the datum aircraft 200, such as to preserve the aeroelastic characteristics of the datum aircraft 200 in the enhanced cargo capacity aircraft 100. Thus, for example, the cargo module is affixed to the datum aircraft 200 in a manner such as to preserve aeroelastic characteristics of the datum aircraft 200 in the enhanced cargo capacity aircraft 100. In other words, the structure of the cargo module 400, and/or the manner in which the cargo module 400 is affixed to the fuselage is/are such as to preserve the aeroelastic characteristics of the datum aircraft in the enhanced cargo capacity aircraft 100. In particular, in at least in this example, the structure of the cargo module 400, and/or the manner in which the cargo module 400 is affixed to the fuselage is/are such as to preserve the aeroelastic characteristics of the datum aircraft in the enhanced cargo capacity aircraft 100 within predetermined limits according to the requirements of the datum aircraft. For example, the cargo module 400 can be provided with a structure having aeroelastic characteristics that match the aeroelastic characteristics of the datum aircraft 200, in particular that having aeroelastic characteristics that match the aeroelastic characteristics of the fuselage 210, in particular that having aeroelastic characteristics that match the aeroelastic characteristics of upper part of the fuselage 210. Additionally or alternatively, the load bearing coupling between the struts 490 and the fuselage 210 can be provided in a manner that allows a limited degree of movement between the cargo module 400 and the fuselage 210 to further enable the aeroelastic characteristics of the datum aircraft to be preserved in the enhanced cargo capacity aircraft 100.

Referring in particular to FIG. 3B, the external aerodynamic fairing 420 comprises, in at least this example, a central longitudinal part 420A, a faired forward longitudinal part 420B, and a faired aft longitudinal part 420C. The central longitudinal part 420A has uniform transverse cross-sections and defines at least a majority of the internal cargo volume 450, while the faired forward longitudinal part 420B and the faired aft longitudinal part 420C aerodynamically blend the central longitudinal part 420A with the fuselage 210 in respective forward and aft longitudinal directions.

According to an aspect of the presently disclosed subject matter, the cargo module 400 is configured for accommodating therein, and thereby transporting via the enhanced cargo capacity aircraft 200, a plurality of cargo units CU in the form of ULDs. Thus each cargo unit CU is in the form of standardized cargo pallets P (also referred to interchangeably herein as standard shipping pallets) or standardized cargo containers SC.

Figure 5A:
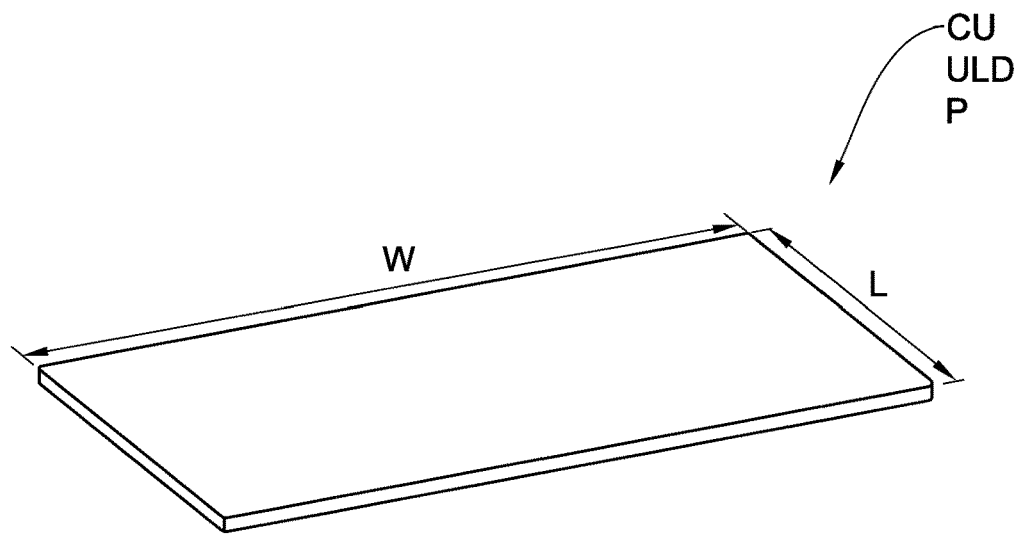
FIG. 5A is an isometric view of a ULD in the form of a standard pallet for use with examples of the cargo module according to aspects of the presently disclosed subject matter.
Figure 6:
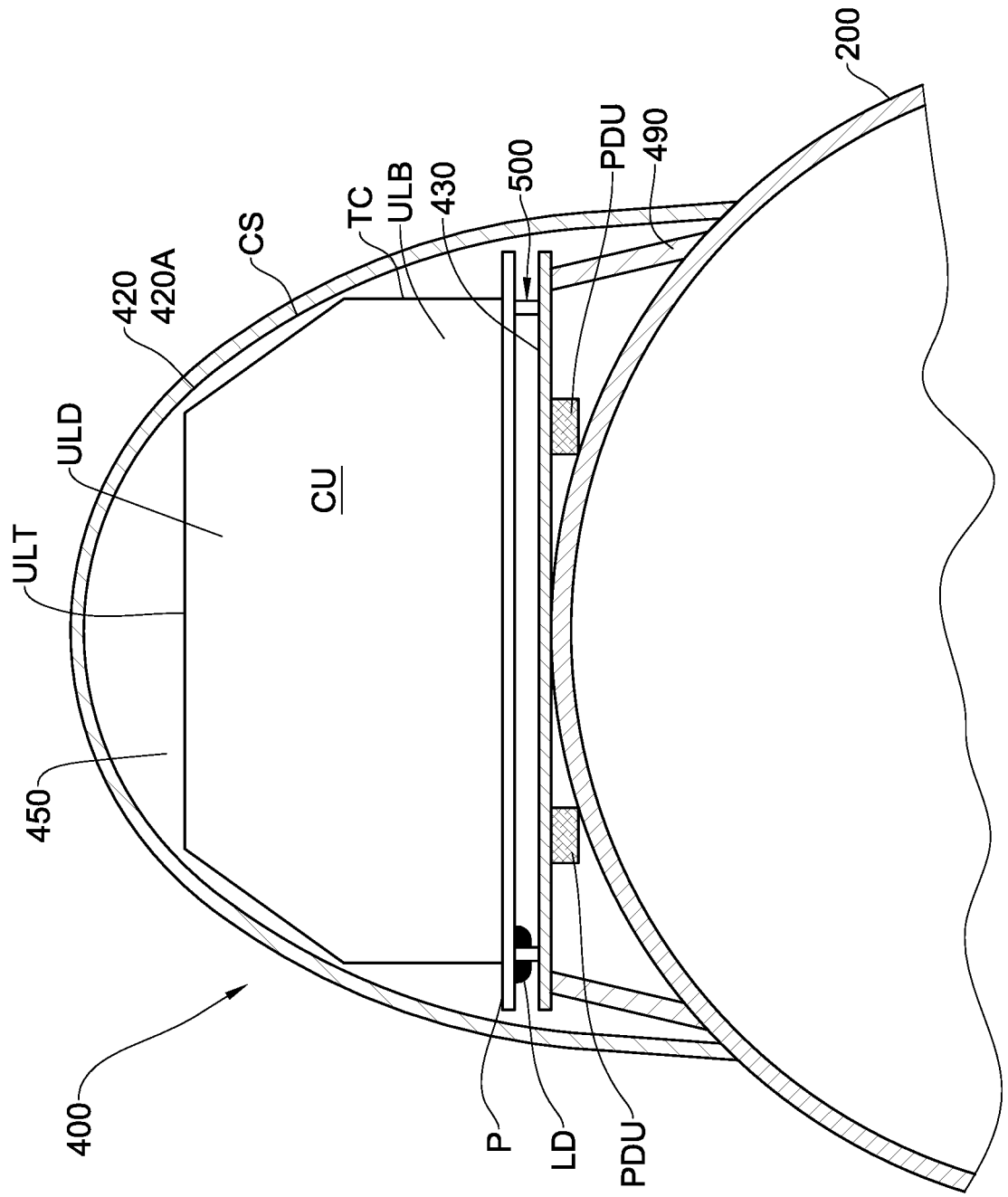
FIG. 6 is a partial cross-sectional view of the example of FIG. 2B taken along C-C, wherein the respective cargo module comprises a first example of a cargo handling system.

Referring to FIG. 5A, such a ULD in the form of a standardized cargo pallet P is well known, having standardized length (L) and width (W) dimensions, and configured for being engaged with conventional locking devices on the freight deck of an aircraft, as is known in the art. Cargo can be secured on the ULD pallet in a conventional manner According to an aspect of the presently disclosed subject matter, the cargo module 400 is configured for engaging at least one, and typically a plurality of, such ULDs in the form of such standardized cargo pallets, and the cargo module 400 comprises suitable locking devices LD (FIG. 6).

Figure 5B:
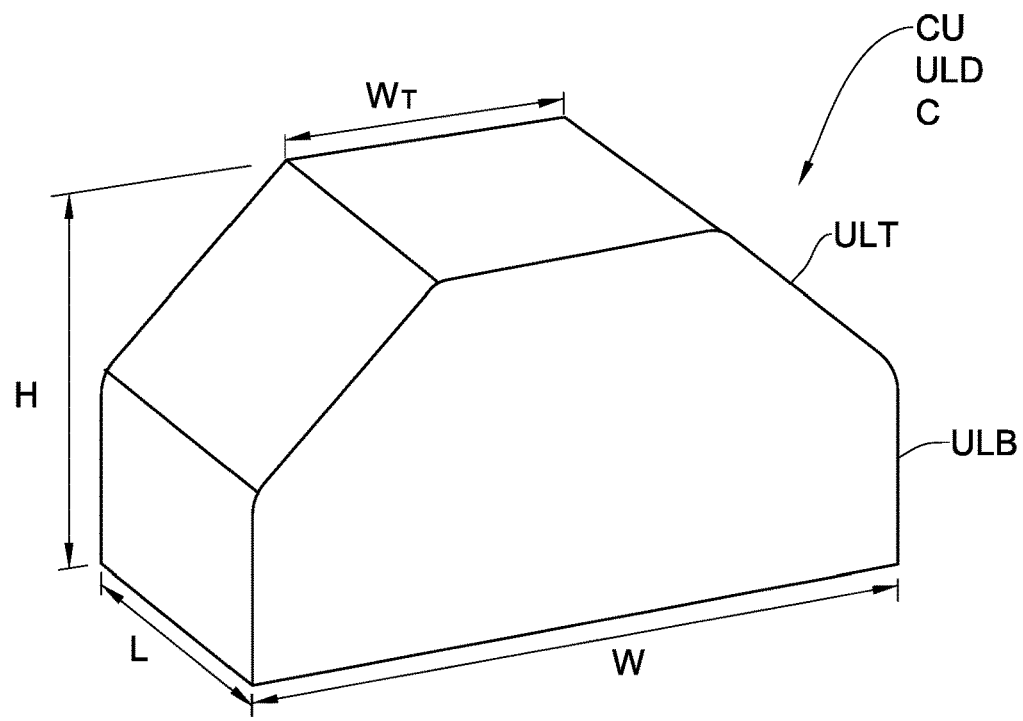
FIG. 5B is an isometric view of a ULD in the form of or cargo unit for use with examples of the cargo module according to aspects of the presently disclosed subject matter.

Referring to FIG. 5B, such a ULD in the form of standardized cargo containers C is well known, having standardized length (L), width (W) and height (H) dimensions, and also configured for being engaged with conventional locking devices on the freight deck of an aircraft, as is known in the art. Cargo can be secured inside the ULD container in a conventional manner. According to an aspect of the presently disclosed subject matter, the cargo module 400 is configured for engaging at least one, and typically a plurality of, such ULDs in the form of such standardized cargo container C, and the cargo module 400 comprises suitable locking devices LD (FIG. 6). Each ULD in the form of such a cargo container has a transverse cross-section including a bottom part ULB having a base transverse width W, and a top part ULT having a transverse width W T that is shorter than the base transverse width W.

In some commonly used ULD pallets, the plan area of the pallet (W×L) can be any one of: 125 inch×96 inch, or 125 inch×88 inch, or 156.2 cm×153.4 cm.

Some commonly used standardized ULD pallets can include for example any one of the following pallets: PLA, PNA, P6P, LD-7, M-6.

Some commonly used standardized ULD containers can for example include AAA or AAY UDLs, measuring 125 inch (width)×88 inch (length)×82 inch (height), or AYY, or AKE, or AMV, or LD-1, or LD-2, or LD-3, or LD-4, or LD-6, or LD-8, or LD-11, or LD-26, or M-1, or M-1H. Referring also to FIG. 6, the central longitudinal part 420A has curved and uniform transverse cross-sections, and is configured for accommodating therein the aforesaid plurality of cargo units CU. For example, the central longitudinal part 420A has compound arc-shaped transverse cross-sections CS, such that the transverse cross-section TC fits snuggly within the arc-shaped transverse cross-sections CS.

As mentioned above, the cargo module 400 comprises a freight deck 410, including cargo handling floor 430. According to an aspect of the presently disclosed subject matter, the cargo handling floor 430 is different from the upper fuselage of the datum aircraft 200, in particular, the cargo handling floor 430 is different from the dorsal skin portion 240 of the dorsal side of the fuselage 210.

Furthermore, according to this aspect of the presently disclosed subject matter, the cargo handling floor 430 is relatively planar, for example similar to flat cargo floor the freight deck of a conventional cargo aircraft, mutatis mutandis.

Furthermore, according to this aspect of the presently disclosed subject matter, the cargo handling floor 430 is configured for enabling a cargo handling system to be installed therein. Such a cargo handling system is configured for transporting and securing cargo units CU within the internal cargo volume 450, and for enabling ingress and egress of the cargo units CU into and out of, respectively, of the internal cargo volume 450

Furthermore, according to this aspect of the presently disclosed subject matter, the cargo module 400 also comprises a cargo handling system 500 configured for transporting and securing ULDs within the internal cargo volume 450, and for enabling ingress and egress of the ULDs into and out of, respectively, of the internal cargo volume 450.

In at least the illustrated example of FIG. 6, cargo handling system 500 comprises a conventional powered cargo handling system, including a conveyor system that is built into the cargo handling floor 430 of the freight deck 410. The conventional powered cargo handling system operates conventionally to move the ULDs, which are in this example in the form of ULD standardized cargo containers C or in the form of ULD standardized cargo pallets P, over the cargo handling floor 430 of the freight deck 410. For example, conventional powered drive units (PDU), which are statically located on the freight deck provide a series of longitudinally spaced powered drive wheels on the floor that in turn engage the underside of the respective ULD and horizontally move the respective ULDs in a variety of horizontal directions on the freight deck 410. When at the desired locations, the respective ULDs are secured thereat via a plurality of locking devices that lock onto a peripheral lip of the integral pallet, as is known in the art.

In alternative variations of this example, and in other examples, the cargo handling system is as disclosed in PCT publication WO 2014/049590, assigned to the present assignee, in particular as disclosed in pages 16 to 48 and with reference to FIGS. 1 to 20 thereof, and these contents are incorporated herein by reference.

Referring to FIG. 7, in yet other alternative variations of this example, and in other examples cargo handling system 500' comprises a conventional manual cargo handling system, including a plurality of rollers and/or castors and/or ball transfer units (BTU) 520 set on the cargo handling floor 430 of the freight deck 410. The ULDs are manually moved over the rollers and/or castors, and secured in place with ropes, belts, or other locking devices. It is to be noted that according to another aspect of the presently disclosed subject matter, the example of the cargo module illustrated in FIG. 7 is not limited to accommodating only ULDs therein, and can be used for transporting different types of cargo units CU, for example cargo not secured or accommodated in ULDs per se, but rather cargo stored in a different format.

In at least each one of the above-disclosed examples, the cargo module 400 is electrically coupled to the electrical system of the datum aircraft 200. For this purpose, the cargo module 400 comprises electrical cabling and circuitry as required for providing internal and external light, power to door actuators and optional PDUs, different sensors and other electrically-powered functions to the cargo module 400. Such electrical cabling and circuitry are suitably coupled to the electrical supply of the datum aircraft 200.

In at least each one of the above-disclosed examples, the cargo module 400 is coupled to the fire extinguisher system of the datum aircraft 200. For this purpose, the cargo module 400 comprises fire extinguishing system, including fire sensors, for example smoke detectors, as required for providing fire extinguishing capability to the cargo module 400, in particular the internal cargo volume 450. Such fire extinguishing system for the cargo module 400 is suitably coupled to the fire extinguishing system of the datum aircraft 200.

Additionally or alternatively, for example, the cargo module 400 comprises an independent smoke detection system and an independent fire extinguishing system, the independent smoke detection system configured for being monitored in the datum aircraft, and the fire extinguishing system configured for being controlled by the datum aircraft, for example via the cockpit controls.

It is further to be noted that the cargo module 400 can be provided to operate in a non-pressurized manner with respect to the external atmosphere. For example, the internal pressure within the cargo volume 450 is nominally maintained equal to the atmospheric air pressure outside of the cargo module 400 at all altitudes. Accordingly, stresses and fatigue resistance of the cargo module 400 can be lower than would otherwise be the case if the cargo module 400 were designed as a pressurized unit, for example in the same manner as the fuselage is pressurized. It is to be noted that such a non-pressurized structure for the cargo module 400 enables the cargo module to be provided as a relatively light weight component (as compared with the cargo module being pressurized), with accompanying cost savings.

In at least some alternative variations of this example, the cargo module 400 can be pressurized in a similar manner to the fuselage 210.

In the above examples, an access hatch can optionally be provided between the interior of the fuselage 210 of the datum aircraft and the interior of the cargo module 400, i.e., between the interior of the fuselage 210 of the datum aircraft and the cargo volume 450. In operation such an access hatch can provide access to the cargo volume of the cargo module from the inside of the fuselage, for example, when the aircraft 100 is on the ground.

In at least some alternative variations of this example, the cargo module 400 can further comprise a loading ramp, that can be configured for being deployed from at least one access door, for example in a telescopic manner, to facilitate loading/unloading cargo between the cargo volume 450 and an outside of the enhanced cargo capacity aircraft 100.

According to simulations carried out by the Assignee, a datum aircraft comprising a Boeing 777 configuration can be converted to an enhanced cargo capacity aircraft according to the presently disclosed subject matter by affixing thereto a cargo module as disclosed herein. Such a conversion can allow for example up to 11 cargo ULDs (for example AAY or AAA ULDs) to be accommodated by the cargo module, enabling a cargo of about 20,000 Kg to be carried by the enhanced cargo capacity aircraft. Furthermore, in such a simulation, the cargo module itself can add about 9,000 Kg to the empty weight of about 170,000 Kg of the datum aircraft. In such simulations, it was estimated by the Assignee that the resulting enhanced cargo capacity aircraft had an additional drag penalty of less than 10%, for example between about 3% and about 7%, as compared with the datum aircraft.

According to other simulations carried out by applicant, a datum aircraft comprising a Boeing 737-800 configuration can be converted to an enhanced cargo capacity aircraft according to the presently disclosed subject matter by affixing thereto a cargo module as disclosed herein. Such a conversion can allow for example up to 4 cargo ULDs (LD4 containers or LD7 pallets, for example) to be accommodated by the cargo module as well as bulk cargo in individual boxes, enabling a cargo of about 6,000 Kg to be carried by the enhanced cargo capacity aircraft. Furthermore, in such a simulation, the cargo module itself can add about 3,000 Kg to the empty weight of about 40,000 Kg of the datum aircraft. In such simulations, it was estimated that the resulting enhanced cargo capacity aircraft would have an additional 25-30% volumetric cargo capacity and additional drag penalty of about 10%, as compared with the datum aircraft. Similar percentages were demonstrated in simulations of examples, of both narrow-body and wide-body commercial planes.

It is to be noted that according to an aspect of the presently disclosed subject matter, the cargo module 400 can be adapted to carry unusual loads, for example cargo having a large longitudinal dimension. By large longitudinal dimension is meant that the unusual load has a length dimension that significantly exceeds the length dimension of a single ULD container or single ULD pallet regarding which the cargo module 400 is designed to accommodate. Such unusual loads can include, for example, wind turbine blades, wings of smaller aircraft, stretch limousines, and so on. In such cases, such an unusual load can be secured on for example two or more ULD pallets that are longitudinally aligned in spaced relationship or in abutting relationship; thereafter the unusual load can be inserted into the cargo module via the front door, and secured in place in a similar manner to that used for securing individual ULDs.

Figure 8A:
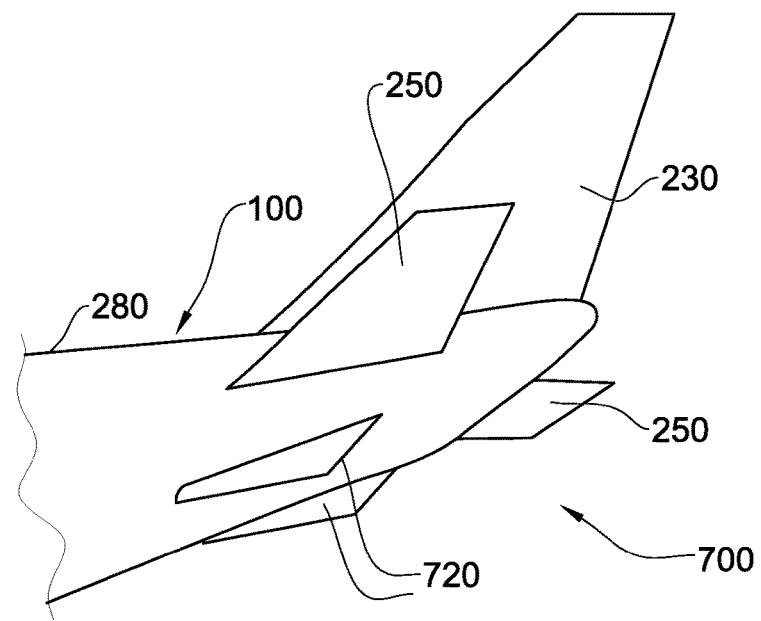
FIG. 8A is a aft-side-bottom isometric partial view of an enhanced cargo capacity aircraft according to an alternative variation of the example of FIG. 2A.
Figure 8B:
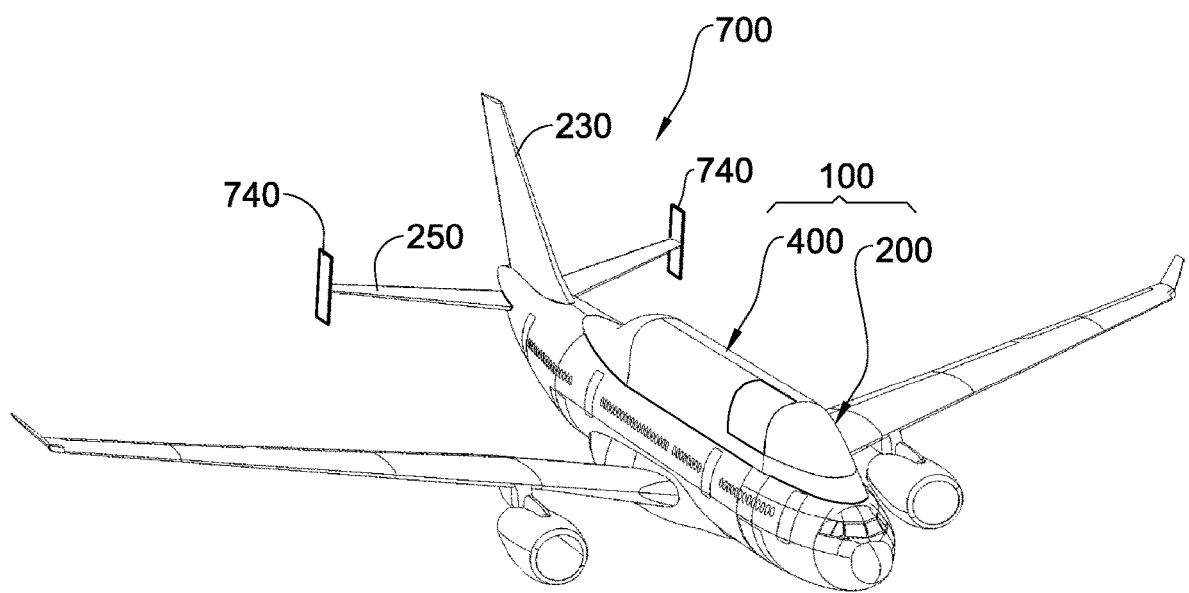
FIG. 8B is a front-side-top isometric view of an enhanced cargo capacity aircraft according to an alternative variation of the example of FIG. 2A.

Referring to FIG. 8A and FIG. 8B, in an alternative variation of the above examples, the enhanced cargo capacity aircraft 100 further optionally comprises an auxiliary vertical stabilizer arrangement 700.

The auxiliary vertical stabilizer arrangement 700 is configured for enhancing the effectiveness of the vertical stabilizer 230 to compensate for any potential shortfall in the effectiveness of the vertical stabilizer 230 in maintaining yaw stability on account of the added vertical footprint provided by the cargo module 400 in the enhanced cargo capacity aircraft 100, as compared with the datum aircraft 200 absent the cargo module 400.

In the illustrated example of FIG. 8A, the auxiliary vertical stabilizer arrangement 700 is in the form of two fins or strakes 720, including a port ventral strake and a starboard ventral strake, in V-arrangement, provided at an underside aft portion of the fuselage 210, for example on the underside of the tail section 280.

In an alternative variation of the above example, and referring to FIG. 8B, the corresponding auxiliary vertical stabilizer arrangement 700 can be provided in the form of auxiliary vertical stabilizers 740 affixed to the horizontal stabilizer 250, for example at the wing tips thereof.

While in the illustrated examples, the datum aircraft is illustrated as a conventional aircraft, having forward lift generating wings 220, and tail section 280 including vertical stabilizer 230 and horizontal stabilizer 250, it is to be noted that in alternative variations of these examples, the datum aircraft can have a different wing configuration, for example as follows:
 canard configuration, in which the main lift-generating wing arrangement of the datum aircraft 200 is aft, and a set of canards is provided forward of the main lift-generating wing arrangement;
 tandem configuration, in which both a forward set of wings and an aft set of wings are each configured to provide lift and to provide stability;
 tailless configuration, in which the main lift generating wings are configured to provide lift and to provide stability, and no separate horizontal stabilizers or canards are provided;
 three-surface or triplet configuration, having a centrally-disposed main lift-generating wing arrangement, a forwards set of canards, and an aft set of horizontal stabilizers.

Furthermore, while in the illustrated examples, the datum aircraft is illustrated as a conventional aircraft, it is to be noted that in alternative variations of these examples, the datum aircraft can have a different configuration.

For example, the datum aircraft can instead have a blended body configuration, in which the lift producing wings and optionally the stabilizers are blended with the fuselage. In such cases, the cargo module is configured to be affixed to an upper part of the blended body configuration in a similar manner to that disclosed herein for conventional fuselage, mutatis mutandis. In such cases, the aforesaid feature "dorsal fuselage part" according to aspects of the presently disclosed subject matter refers to the aforesaid upper part of the blended body configuration.

In another example, the datum aircraft can instead have a flying wing configuration, in which the functions of the fuselage (for example providing a cockpit, freight deck or passenger deck) are provided by the flying wing configuration. In such cases, the cargo module is configured to be affixed to an upper part of the flying wing configuration in a similar manner to that disclosed herein for conventional fuselage, mutatis mutandis. In such cases, the aforesaid feature "dorsal fuselage part" according to aspects of the presently disclosed subject matter refers to the aforesaid upper part of the flying wing configuration.

In another example, the datum aircraft can instead have a lifting body configuration, in which the functions of the wings (for example providing aerodynamic lift) are provided by the lifting body configuration. In such cases, the cargo module is configured to be affixed to an upper part of the lifting body configuration in a similar manner to that disclosed herein for conventional fuselage, mutatis mutandis. In such cases, the aforesaid feature "dorsal fuselage part" according to aspects of the presently disclosed subject matter refers to the aforesaid upper part of the lifting body configuration.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the scope of the presently disclosed subject matter as set out in the claims.

The invention claimed is:

1. An enhanced cargo capacity aircraft, converted from a datum aircraft, comprising:
 (a) the datum aircraft, wherein the datum aircraft comprises at least a fuselage having a dorsal fuselage part,
 (b) a cargo module affixed to the datum aircraft, thereby converting the datum aircraft to the enhanced cargo capacity aircraft;
 (c) the datum aircraft being designed for aerodynamic flight capability absent said cargo module;
 (d) the enhanced cargo capacity aircraft being capable of aerodynamic flight;
 (e) the cargo module providing enhanced cargo capacity to the datum aircraft, the cargo module comprising an external aerodynamic fairing defining an internal cargo volume, and configured for being conformally affixed in overlying relationship with respect to the dorsal fuselage part, the cargo module comprising a cargo handling floor and at least one access door, and a cargo handling system configured for transporting and securing at least one cargo unit within said cargo volume, wherein said cargo unit comprises a standard unit load device (ULD).

2. The enhanced cargo capacity aircraft according to claim 1, wherein each said ULD is in the form of a standardized cargo pallet or in the form of standardized cargo container.

3. The enhanced cargo capacity aircraft according to claim 1, wherein said cargo module comprises suitable locking devices for locking the respective ULD thereto.

4. The enhanced cargo capacity aircraft according to claim 1, wherein at least one said ULD is in the form of a standardized cargo pallet having a pallet plan area (width× length) including any one of: 125 inch×96 inch, or 125 inch×88 inch, or 156.2 cm×153.4 cm.

5. The enhanced cargo capacity aircraft according to claim 1, wherein at least one said ULD is in the form of a standardized cargo container including any one of: AAA ULD; AAY ULD.

6. The enhanced cargo capacity aircraft according to claim 1, wherein said cargo handling floor is nominally flat and configured for enabling said cargo handling system to transport and secure said at least one cargo unit within said cargo volume.

7. The enhanced cargo capacity aircraft according to claim 1, wherein said cargo module comprises a plurality of powered drive units (PDU) statically located on the cargo floor.

8. The enhanced cargo capacity aircraft according to claim 1, wherein said cargo module comprises at least one said access door in the form of a side door and configured for enabling lateral access to the internal cargo volume.

9. The enhanced cargo capacity aircraft according to claim 1, wherein said cargo module comprises at least one said access door in the form of a front door and configured for enabling longitudinal access to the internal cargo volume.

10. The enhanced cargo capacity aircraft according to claim 1, wherein said cargo module is configured for enabling the cargo floor to be affixed to the dorsal fuselage part.

11. The enhanced cargo capacity aircraft according to claim 1, wherein said cargo module is coupled to the fire extinguisher system of the datum aircraft.

12. The enhanced cargo capacity aircraft according to claim 1, wherein said cargo module comprises an independent smoke detection system and an independent fire extinguishing system, the independent smoke detection system configured for being monitored in the datum aircraft, and the fire extinguishing system configured for being controlled by the datum aircraft.

13. The enhanced cargo capacity aircraft according to claim 1, wherein said cargo module is electrically coupled to the electrical system of the datum aircraft.

14. The enhanced cargo capacity aircraft according to claim 1, wherein said cargo module is non-pressurized with respect to the external atmospheric environment.

15. The enhanced cargo capacity aircraft according to claim 1, wherein said datum aircraft comprises a vertical stabilizer, and wherein said enhanced cargo capacity aircraft comprises a auxiliary vertical stabilizer arrangement configured for enhancing an effectiveness of the vertical stabilizer.

16. The enhanced cargo capacity aircraft according to claim 15, including at least one of:
   wherein said auxiliary vertical stabilizer arrangement comprises a port ventral strake and a starboard ventral strake, affixed to said fuselage in V-arrangement; and
   wherein said datum aircraft includes horizontal stabilizers, and wherein said auxiliary vertical stabilizer arrangement comprises auxiliary vertical stabilizers affixed to the horizontal stabilizer.

17. The enhanced cargo capacity aircraft according to claim 1, wherein the cargo module is configured, at least when affixed to the datum aircraft, such as to preserve aeroelastic characteristics of the datum aircraft in the enhanced cargo capacity aircraft.

18. The enhanced cargo capacity aircraft according to claim 1, wherein the datum aircraft is any suitable aircraft selected from the group including: Boeing 777, Boeing 767, Boeing 747, Airbus 330.

19. An enhanced cargo capacity aircraft, converted from a datum aircraft, comprising:
   (a) the datum aircraft, including at least a fuselage having a dorsal fuselage part,
   (b) a cargo module affixed to the datum aircraft, thereby converting the datum aircraft to the enhanced cargo capacity aircraft;
   (c) the datum aircraft designed for aerodynamic flight capability absent said cargo module,
   (d) the enhanced cargo capacity aircraft being capable of aerodynamic flight;
   (e) the cargo module providing enhanced cargo capacity to the datum aircraft, the cargo module comprising an external aerodynamic fairing defining an internal cargo volume, and configured for being conformally affixed in overlying relationship with respect to the dorsal fuselage part, the cargo module comprising a cargo handling floor and at least one access door, and a cargo handling system configured for transporting and securing at least one cargo unit within said cargo volume, wherein said cargo handling floor is nominally flat and comprises a manual cargo handling system.

20. A method for converting a datum aircraft into an enhanced cargo capacity aircraft, comprising:
   (a) providing the datum aircraft, wherein the datum aircraft comprises at least a fuselage having a dorsal fuselage part,
   (b) providing a cargo module configured for providing enhanced cargo capacity to the datum aircraft, the cargo module comprising an external aerodynamic fairing defining an internal cargo volume, and configured for being conformally affixed in overlying relationship with respect to the dorsal fuselage part, the cargo module comprising a cargo handling floor and at least one access door, and a cargo handling system configured for transporting and securing at least one cargo unit within said cargo volume, wherein said cargo unit comprises a standard unit load device (ULD);
   (c) affixed the cargo module to the datum aircraft, thereby converting the datum aircraft to the enhanced cargo capacity aircraft;
   wherein the datum aircraft is designed for aerodynamic flight capability absent said cargo module; and
   wherein the enhanced cargo capacity aircraft is capable of aerodynamic flight.

21. The method according to claim 20, further comprising electrically coupling said cargo module to an electrical system of the datum aircraft.

22. The method according to claim 20, further comprising coupling said cargo module to a fire extinguisher system of the datum aircraft, and optionally further comprising providing said cargo module with an independent smoke detection system and an independent fire extinguishing system, the independent smoke detection system configured for being monitored in the datum aircraft, and the fire extinguishing system configured for being controlled by the datum aircraft.

23. A method for converting a datum aircraft into an enhanced cargo capacity aircraft, comprising:
   (a) providing the datum aircraft, wherein the datum aircraft comprises at least a fuselage having a dorsal fuselage part,
   (b) providing a cargo module configured for providing enhanced cargo capacity to the datum aircraft, the cargo module comprising an external aerodynamic fairing defining an internal cargo volume, and configured for being conformally affixed in overlying relationship with respect to the dorsal fuselage part, the cargo module comprising a cargo handling floor and at least one access door, and a cargo handling system configured for transporting and securing cargo units within said cargo volume, wherein said cargo handling floor is nominally flat and comprises a manual cargo handling system;
   (c) affixed the cargo module to the datum aircraft, thereby converting the datum aircraft to the enhanced cargo capacity aircraft;
   wherein the datum aircraft is designed for aerodynamic flight capability absent said cargo module; and
   wherein the enhanced cargo capacity aircraft is capable of aerodynamic flight.

* * * * *